United States Patent
Cerda et al.

(10) Patent No.: US 6,869,001 B2
(45) Date of Patent: Mar. 22, 2005

(54) DEVICE FOR THE MAINTENANCE OF SEMI-AUTOGENOUS GRINDING MILLS USED IN LARGE-SCALE MINING

(75) Inventors: Luis Ortiz Cerda, Huechuraba (CL); Jose Cabrera Guzman, Santiago (CL); Justo Vargas Luna, Huechuraba (CL)

(73) Assignees: Corporacion Nacional del Cobre de Chile, Santiago (CL); Instituto de Innovacion en Mineria y Metalurgia, Santiago (CL)

( * ) Notice: Subject to any disclaimer, the term of this patent is extended or adjusted under 35 U.S.C. 154(b) by 0 days.

(21) Appl. No.: 10/686,665

(22) Filed: Oct. 17, 2003

(65) Prior Publication Data

US 2004/0118262 A1 Jun. 24, 2004

Related U.S. Application Data

(63) Continuation of application No. 10/005,176, filed on Dec. 7, 2001, now abandoned.

(30) Foreign Application Priority Data

Dec. 7, 2000 (CL) .......................................... 3393-2000

(51) Int. Cl.[7] ................................................ B26D 1/06
(52) U.S. Cl. ............................ 225/104; 30/180; 30/182
(58) Field of Search ................................ 225/103–105; 83/639.1; 30/134, 135, 180, 182, 179, 90.4, 90.8

(56) References Cited

U.S. PATENT DOCUMENTS

| | | | | |
|---|---|---|---|---|
| 1,156,745 A | * | 10/1915 | Brady | ........................ 30/272.1 |
| 2,459,864 A | * | 1/1949 | Bissett et al. | .................. 30/134 |
| 2,985,960 A | * | 5/1961 | Hill | ............................. 30/272.1 |
| 3,237,302 A | * | 3/1966 | Fennell | ........................ 30/135 |
| 3,495,330 A | | 2/1970 | Bruce | |
| 3,906,628 A | * | 9/1975 | Hastings | ...................... 30/182 |
| 3,992,777 A | | 11/1976 | Perkins et al. | |
| 4,257,163 A | | 3/1981 | Bauer | |
| 4,285,126 A | | 8/1981 | Irwin | |
| 4,698,909 A | | 10/1987 | Sleigh | |
| 5,235,750 A | * | 8/1993 | Brown | ........................ 30/135 |
| 5,479,710 A | | 1/1996 | Aston | |
| 2002/0084301 A1 | * | 7/2002 | Murgatroyd | ................ 225/105 |

* cited by examiner

Primary Examiner—Kenneth E. Peterson
(74) Attorney, Agent, or Firm—Millen, White, Zelano & Branigan, P.C.

(57) ABSTRACT

A nut cold cutter devise is used in the assembly and maintenance of semi-autogenous grinding mills for large-scale mining. The device includes a front body, a back body and a hydraulic cylindrical chamber located between the front and back bodies. The front body has a defined cavity in which there is a movable cutting tool and a fixed cutting tool. The nut to-be-cut is positioned in the space located between the two cutting tools. The hydraulic cylindrical chamber contains a push piston that is sealed to the inside of said hydraulic cylindrical chamber with watertight joints. The push piston is attached to a toolholder axis and the movable cutting tool is attached to the front end of the toolholder axis.

17 Claims, 5 Drawing Sheets

DEVICE FOR THE MAINTENANCE OF SEMI-AUTOGENOUS GRINDING MILLS USED IN LARGE-SCALE MINING

RELATED APPLICATIONS

This application is a continuation of application Ser. No. 10/005,176, filed on Dec. 7, 2001 now abandoned. The entire disclosure is incorporated herein by reference.

This invention is aimed at creating a device for the maintenance of semi-autogenous grinding mills used in large-scale mining. In specific terms, the invention entails a hydraulically powered, nut cold cutting device with a movable cutting tool and a fixed cutting tool. Furthermore, this tool can be interfaced with a guided or remote control station for easy operation.

PRIOR ART

As part of the large-scale copper mining explotation processes, grinding the rock containing the ore is a distinctively important process along the chain of operations whose objective is to obtain high grade metal. Said grinding is performed after the rock has been extracted from the exploitation embankments and first crushed in the primary, secondary and tertiary crushers, whichever may be the case.

Currently, the rock is also ground in semi-autogenous grinding mills (SAG mills), which are very large machines whose size usually ranges from 9.7 to 11 meters in diameter and 4.5 to 5.2 meters in length. Furthermore, these mills have an inner lining, such as lifters or rock elevators that facilitate the rock grinding process, which is why they are called semi-autogenous grinders.

The inner linings of this type of mill are subjected to strong impact and friction produced by the rock, which clearly over time results in the wear and tear of the linings and their eventual replacement. Likewise, these linings are attached to the mill's main structure or shell with nuts, bolts and washers. The bolt goes through the mill (passing through the inside and coming out at the other end), and the washer and nut are placed on the protruding end of the bolt thereby tightly squeezing the abovementioned linings.

It is important to point out that these nuts, bolts and washers are very large in size since they must pass through the main structure, which is made out of thick.

As a result, when the lining reaches the end of its service life, the nuts must be loosened in order to free the bolts squeezing the linings in place. Loosening the nuts is not at all simple since, as previously explained, they are so tightly in place that it is practically impossible to loosen them by merely turning them. Therefore, the easiest way to take off the nuts is breaking them by way of a common process known as oxy-cutting or oxyacetylene, which consists of using a flame torch with an oxygen/carbon mixture that weakens the metal (nut) by melting it, and that way it can be cut and then the fragments of the nut are separated.

This nut-removal process is performed by specially trained professionals and is considered a high-risk job, basically because the workers must "climb" the main structure of the mill, given its size, and then they must perform the oxy-cutting, which implies a great risk of accidents given the likelihood of one of the workers falling from the tall mills and working amongst iron structures, nuts and bolts. Also, oxy-cutting involves additional risks given the sparks and high temperature at which it is performed.

Furthermore, the time involved in replacing the linings entails significant costs in the copper metal production since in order to carry out such an operation, the site must shut down, therefore automatically decreasing the quantity of ore processed and, consequently, less metal is produced. Therefore, creating a device that would allow for decreasing the time the mills needs to be shut down for maintenance purposes automatically translates into increased production, a significant decrease in risks and lower risk-related costs.

ADVANTAGES OF THE INVENTION

Having read the pre-art description and the drawbacks involved in SAG mill maintenance, the advantages of this invention device can be described as follows:

A significant reduction in mill maintenance time given the increased speed

A notable reduction in the human risk factor since that use of the invention device prevents high altitude work.

Use of oxy-cutting or oxyacetylene is avoided along with the toxic gases given off by these processes.

Large savings in production-related costs since operations are shut down for less time for maintenance purposes.

It is possible to interface the tool with a guided or remote control station given the lightweight of its overall structure.

It is entirely made out of wear and tear components that can be easily removed and replaced.

It is compact, solid and easy to assemble.

DESCRIPTION OF INVENTION

Figure 1:
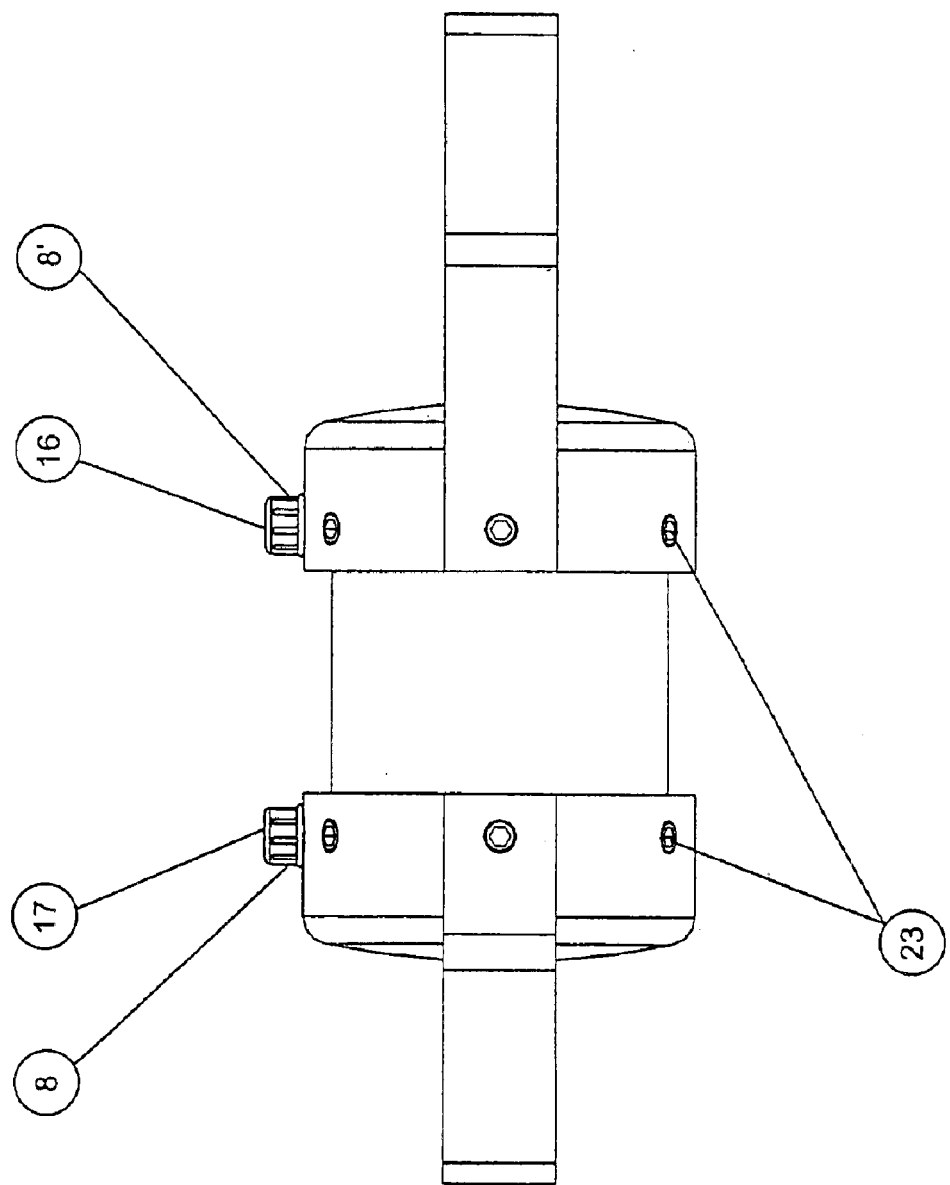
FIG. 1: provides a side view of the invention device.

The invention device is primarily made up of a front body (7), a hydraulic cylindrical chamber (1) a back body (8), in which the hydraulic cylindrical chamber (1) is located between said front body (7) and said back body (8).

The hydraulic cylindrical chamber (1) consists of a push piston (12) on the inside that remains sealed inside said chamber (1), which defines the piston stroke (12), based on the action of the watertight joints (14). Said piston (12) is joined to a toolholder axis (11) through joining elements (13). Also, the front end (4) of the toolholder axis (11) is where the movable cutting tool (15) is tied to the joining element (13').

This way, when hydraulic force is applied to the push piston (12), the push piston is activated and moves the toolholder axis (11), which then causes the movable cutting tool (15) to move. The movable cutting tool's (15) geometry has a unique trait that is its angle finishing ($\alpha$), preferably a sharp angle, that makes it possible to generate all the pressure exerted by the push piston (12) on one specific point.

Because of its unique geometry, the movable cutting tool (15) is the first component to penetrate the metallic body (10) to-be-destroyed. As it continues to penetrate along the initial fissure made in the metallic body (10), caused by the first penetration of the movable cutting tool (15), the pressure of the hydraulic force transmitted by the push piston (12), makes the initial cut expand.

On this same imaginary axis (A) that defines the system's center or device's longitudinal axis, and therefore the longitudinal axis of the movable cutting tool (15), facing the first cutting tool is a second cutting tool (3) the same as the first but that cannot move, in other words, it remains fixed at all times.

As pressure is exerted onto the system, the second cutting tool (3) begins to penetrate the opposite end of the end originally penetrated by the movable cutting begins to split on both ends along the same imaginary axis (A) until being completely destroyed, and split into two pieces, after which it is no longer tightly secured.

Figure 2:
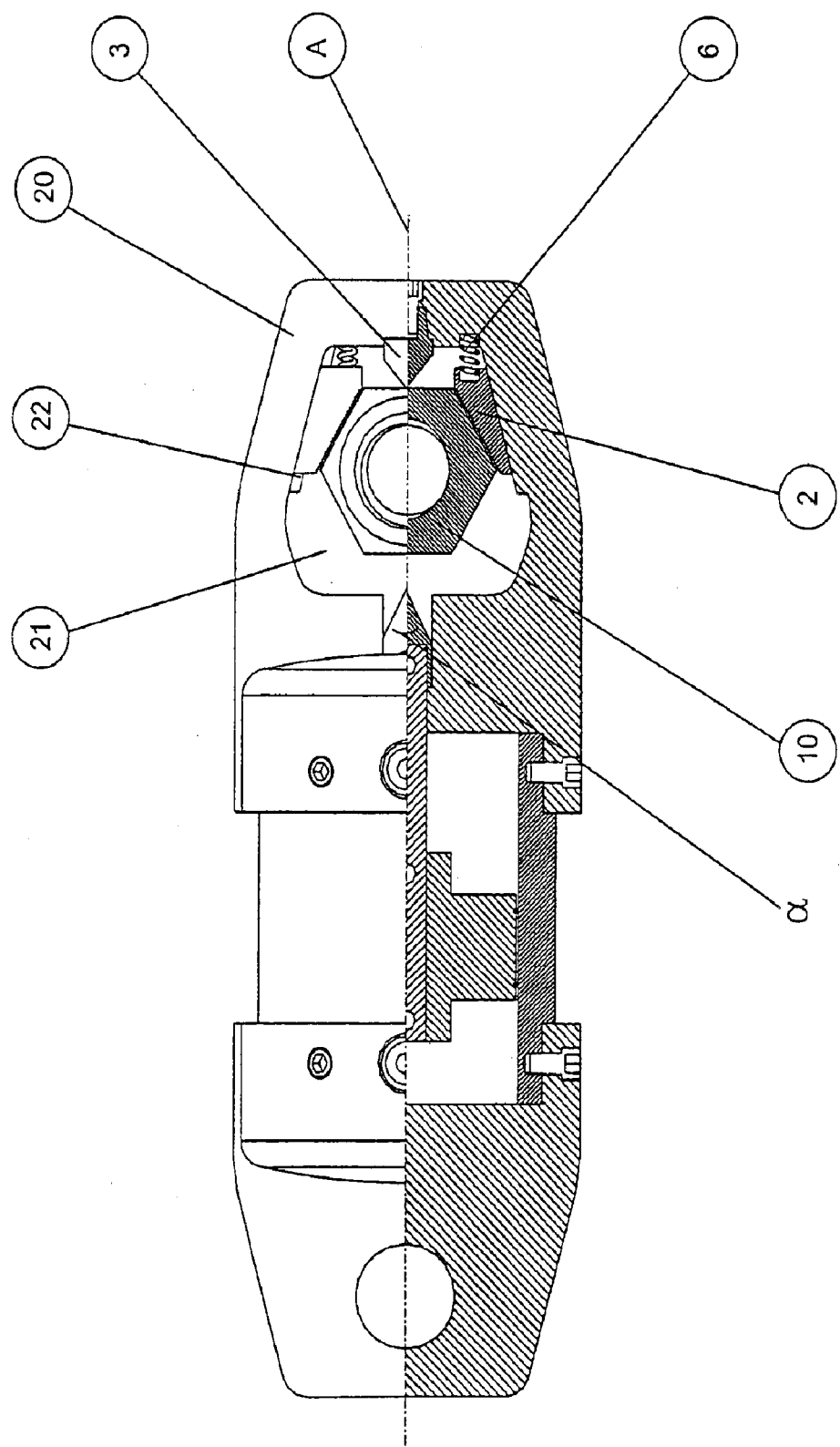
FIG. 2: provides an overhead view with a cutaway view of the invention device.
Figure 3:
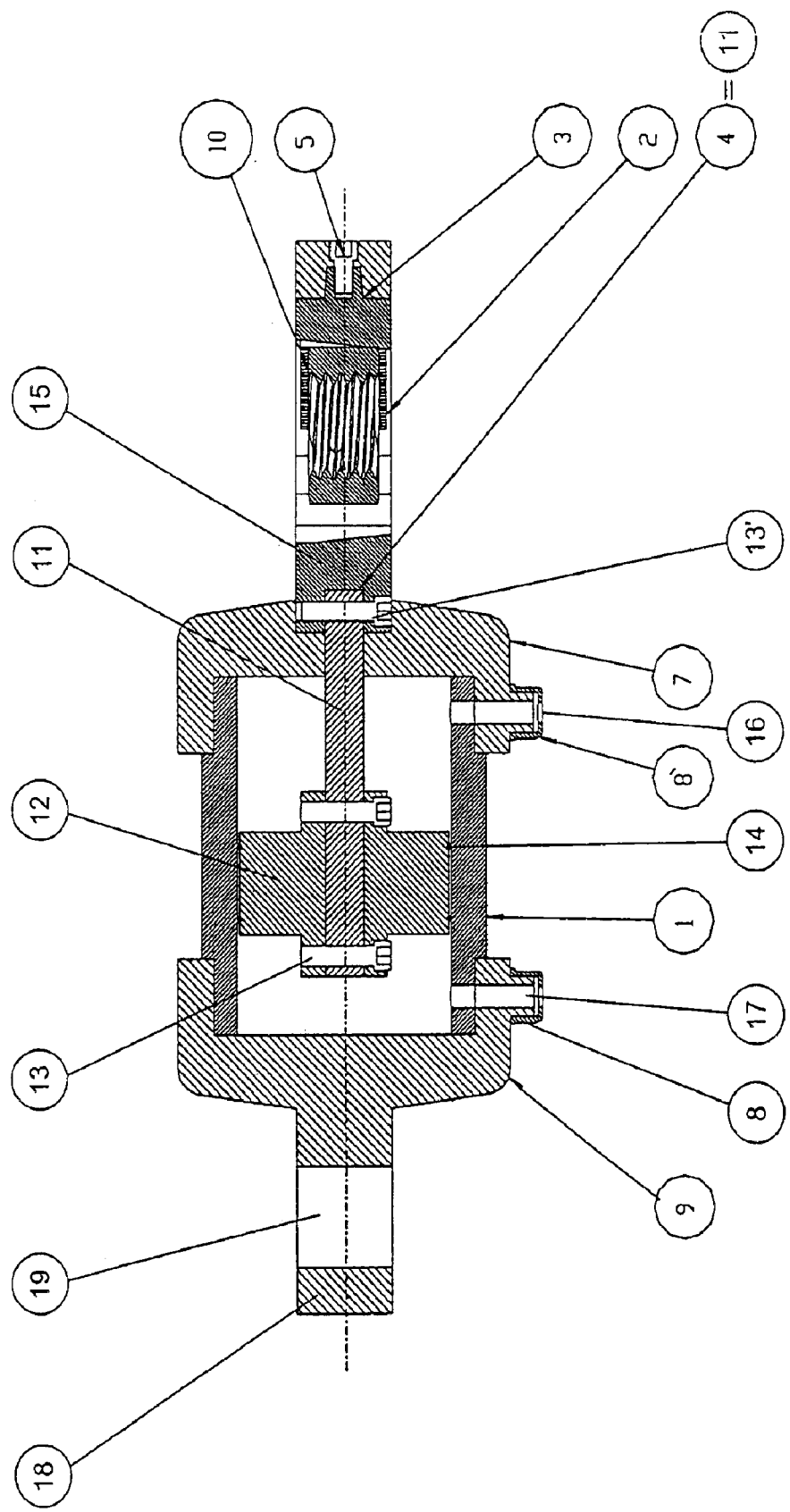
FIG. 3: provides a profile cutaway view of the invention device.
Figure 4:
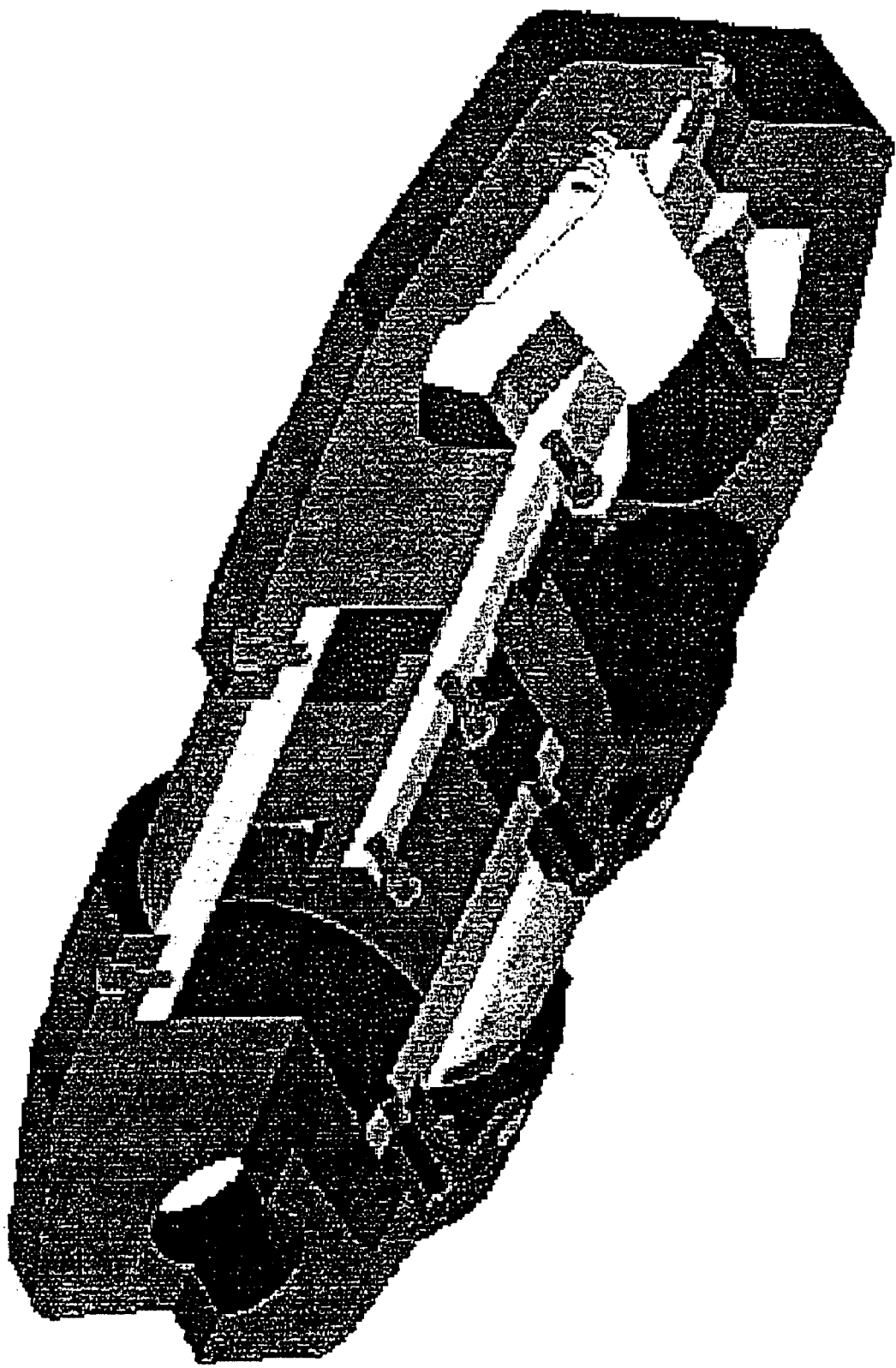
FIG. 4: provides an angle and cutaway view of the invention device.
Figure 5:
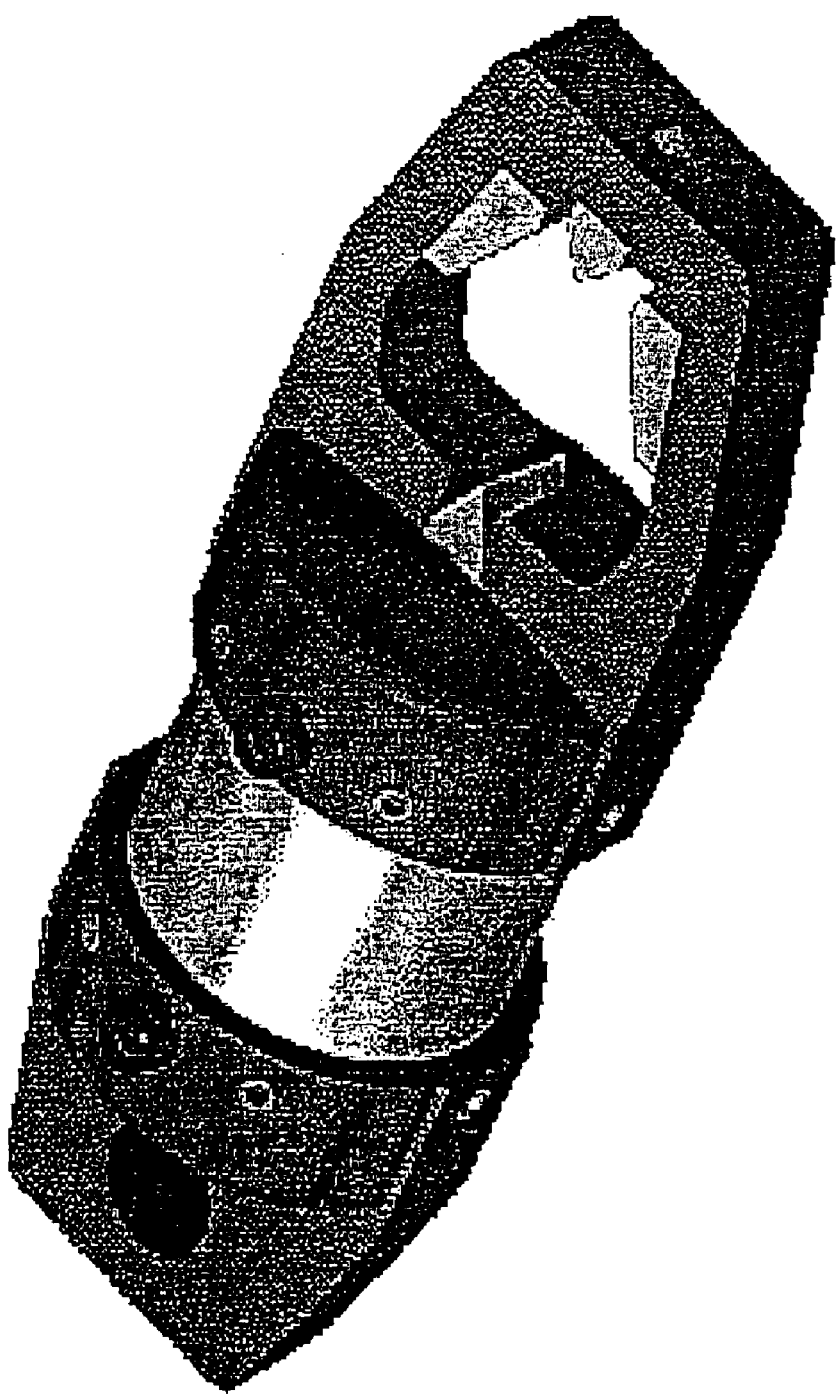
FIG. 5: provides an angle view of the invention device

As illustrated in FIG. 2, the cutting tool (3) is fixed onto the upper end (20) in a cavity (21) defined on the inside of the front body (7). Furthermore, the figure also illustrates that said cavity (21) of the front body (7) is where the to-be-destroyed metallic body (10) should be located. Also, on the lower end of the place where the cutting tool's blade (3) is located, there is a pushing element (5) designed to slightly move the cutting tool (3) when said tool has already reached the end of its useful life, and remove said tool which will be replaced by a new one.

Two moving bodies (2) capable of sliding and being pressed by the action of the forward movement of the springs (6) located on the inside of each upper side of the front body (7) are available in order to achieve an exact position of the metallic body (10) to-be-destroyed, in which usually, but not preferably, there is a nut commonly in a hexagonal peripheral section.

As illustrated in FIG. 2, said movable bodies (2) make it possible for both cutting tools to make the cut in the metallic body (10) on one imaginary axis (A) of reference. That is, a parallelism action is produced in the cut.

The movable bodies (2) are mounted on fixed guides (22) on the upper inside face of the front body (7). These guides (22) are a kind of rail that prevents the movable bodies (2) from moving in the wrong direction along their defined longitudinal course.

As a result of the action of the movable bodies (2), the metallic body (10), in this case a hexagonal peripheral section, remains set or fixed in such a way that the cut is made in the area where the material is least thick, thereby enabling the cut to be made as quickly as possible exerting the least amount of wear and tear on the cutting tools and on the device in general.

Furthermore, the front body (7) and the back body (9) can be easily removed.

A connection shank (18) is attached to the back body (9). Said shank (18) has an orifice (19) by way of which you can interface the invention device with a remote control system. There is also a hydraulic fluid access point (17) located on the side of the back body (9) through which the hydraulic fluid reaches the hydraulic chamber (1), and begins to generate pressure on the push piston (12). A coupling (8) has been added to the hydraulic fluid access (17) making it possible to join the line of a hydraulic force generation system to the invention device. Likewise, the hydraulic fluid exit point is located on the front body (7) allowing for said fluid to return to the cited generation system. Just like on the hydraulic fluid access (17), a coupling (8') has been placed on the hydraulic fluid exit (16) to allow for connecting the invention device to the hydraulic force generation system.

From another perspective, the movable cutting tool (15) and the fixed cutting tool (3) are manufactured from steel covered in carbide-tungsten or carbide-silicon, or any other alloy with an extremely hard surface.

The front body (7) and the back body (9) have each been manufactured from one forged body that is subsequently thermally treated and mechanized. These bodies are made from high-strength forged steel that consists of a chrome-nickel-molybdenum combination as the main alloy elements. The fact that the front and back bodies have been manufactured from forged steel makes it possible for the invention device to respond uniformly under such force when performing its various tasks. The cylindrical chamber (1) is manufactured from stainless steel.

The movable bodies (2) are manufactured from special high-strength steel with chrome-nickel type alloy elements. The springs (6) are manufactured from steel commonly called "sprung steel," which is steel with high silicon content.

Finally, the joining elements (13) and (13') are also made out of high-strength steel with a chrome-nickel alloy; and the front and back bodies are attached to the hydraulic chamber (1) by way of high-strength bolts (23) with unique elasticity characteristics.

What is claimed is:

1. A cold nut-cutting device used in the assembly and maintenance of semi-autogenous grinding mills for large-scale mining wherein the nut-cutting device comprises:
    a front body, a back body and a hydraulic cylindrical chamber located between the front and back bodies; said front body having a defined cavity in which there is a movable cutting tool and having a fixed cutting tool, a nut to-be-cut being positioned in the space located between the two cutting tools, and two front mobile bodies having oblique nut-e-surfaces, the two front mobile bodies being slidable in converging directions and being biased by springs located at one end of the front body, the two front mobile bodies baring against the nut-to-be-cut to allow the nut to be cut in an exact position.

2. The nut-cutting device of claim 1 wherein said movable bodies are manufactured from high-strength steel with chrome-nickle alloy elements and wherein said springs are steel with high silicon content.

3. The nut-cutting device in of claim 1 wherein said push piston is attached to a toolholder axis by joining elements, and wherein said movable cutting tool is attached to a front end of said toolholder axis.

4. The nut-cutting device of claim 3 wherein said movable cutting tool has a geometry defining a sharp angle finished for cutting.

5. The nut-cutting device of claim 1 wherein said fixed cutting tool is located in a front-facing position with respect to said movable cutting tool and on a level defined by a longitudinal axis of said movable cutting tool.

6. The nut-cutting device of claim 5 wherein said fixed cutting tool is interfaced with an upper inside end of said front body.

7. The nut-cutting device of claim 1 wherein said fixed cutting tool is interfaced with an upper inside end of said front body.

8. The nut-cutting device of claim 1 wherein said movable bodies are mounted on fixed guides located on an inside surface of said front body to prevent said movable bodies from moving in a wrong direction along a defined longitudinal course thereof.

9. The nut-cutting device of claim 1 including a connection shank with an orifice adapted to connect the nut-cutting device to a remote control system that is attached to said back body.

10. The nut-cutting device of claim 1 wherein there is a hydraulic fluid inlet and a hydraulic fluid exit on sides of the front and back bodies, respectively, for driving a piston positioned in said hydraulic cylindrical chamber.

11. The nut-cutting device of claim 10 wherein couplings that allow for connecting the nut-cutting device to a hydraulic force generation system are on said hydraulic fluid access and exit.

12. The nut-cutting device of claim 1 wherein said movable and fixed cutting tools are each a single forged body that is thermally treated.

13. The nut-cutting device of claim 1 wherein said front and back bodies are a single forged bodies that is thermally treated.

14. The nut-cutting device of claim 13 wherein said forged bodies are made from high-strength forged steel with chrome-nickel-molybdenum as a main alloy elements.

15. The nut-cutting device of claim 1 wherein the body of said circular hydraulic chamber is made of stainless steel.

16. The nut-cutting device of claim 1 wherein said hydraulic cylindrical chamber contains a push piston therein that is sealed inside of said hydraulic cylindrical chamber with watertight joints.

17. The nut-cutting device of claim 16 wherein said push piston is attached to a toolholder axis by joining elements, and wherein said movable cutting tool is attached to a front end of a toolholder axis.

* * * * *

UNITED STATES PATENT AND TRADEMARK OFFICE
CERTIFICATE OF CORRECTION

PATENT NO. : 6,869,001 B2
APPLICATION NO. : 10/686665
DATED : March 22, 2005
INVENTOR(S) : Luis Ortiz Cerda et al.

It is certified that error appears in the above-identified patent and that said Letters Patent is hereby corrected as shown below:

Column 4, line 30, reads "nut to-be-cut" should read --nut-to-be-cut --
Column 4, line 32, reads "nut-e-surfaces," should read -- nut-engaging surfaces --
Column 5, line 13, reads " a single forged bodies" should read -- a single forged body --
Column 6, line 3, reads "a main allov" should read -- main alloy --

Signed and Sealed this

Fifteenth Day of August, 2006

JON W. DUDAS
*Director of the United States Patent and Trademark Office*